Feb. 11, 1969  G. J. CAGGIANO ET AL  3,426,980
DOUBLE TUNED NUTATION DAMPER
Filed Jan. 5, 1966
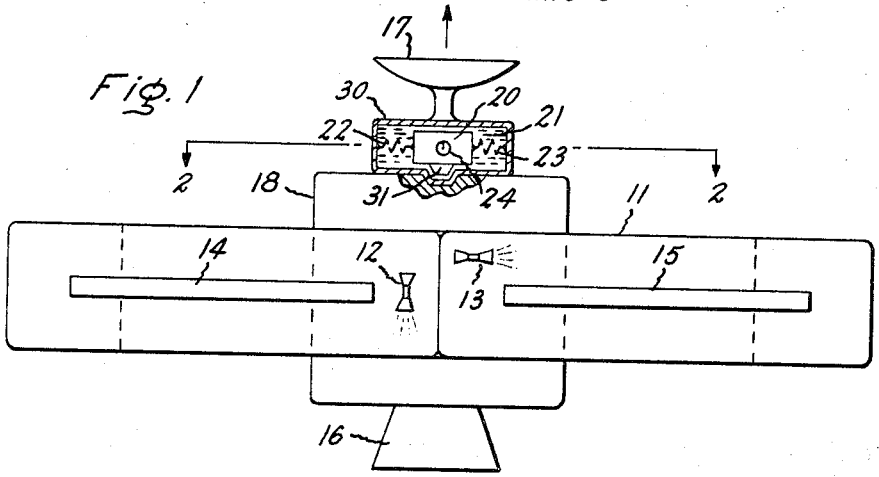
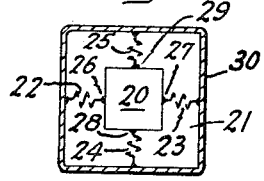
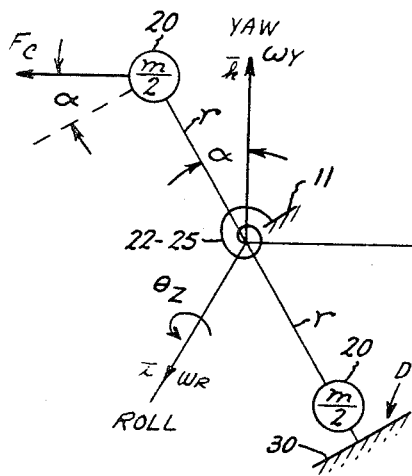
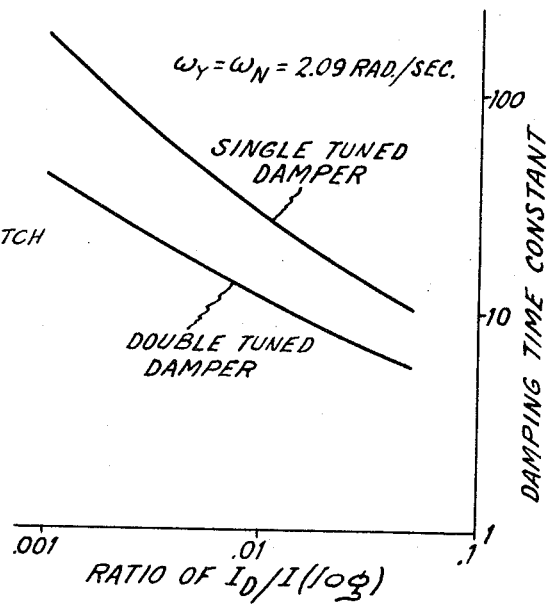

United States Patent Office 3,426,980
Patented Feb. 11, 1969

3,426,980
DOUBLE TUNED NUTATION DAMPER
Gerard J. Caggiano, Endicott, and Robert C. Wells, Endwell, N.Y., assignors to General Electric Company, a corporation of New York
Filed Jan. 5, 1966, Ser. No. 518,852
U.S. Cl. 244—1  4 Claims
Int. Cl. B64c 17/02

ABSTRACT OF THE DISCLOSURE

This invention relates to attitude controlling of spinning space vehicles, and more particularly, to a device for providing passive damping of spinning vehicle nutations. The damper consists of a mass placed in a damping fluid and attached to the vehicle through a spring suspension means. By locating the center of gravity of the mass along the spin axis of the vehicle but at a distance from the vehicle center of gravity, and providing a spring suspension, centrifugal forces on the mass add to the damping forces applied by the mass to the vehicle, thus providing faster nutation damping for a given size mass.

---

This invention relates to apparatus for stabilizing spinning vehicles. Performance is improved for artificial satellites, which spin so as to produce an artificial gravity effect, and for which it is desirable to maintain a constant spin axis orientation in space. That is, the invention is directed to aiding the control spin axes in space vehicles and equivalent apparatus where bearings are not present to constrain the spin axis.

Numerous kinds of apparatus have been provided for stabilizing the attitude of space vehicles such as reaction jets, torque gyros, etc., which are satisfactory for many missions. However, such apparatus necessarily requires significant amounts of fuel for operation. It is axiomatic that it is desirable to perform space vehicle operations with the minimum amount of fuel energy. Accordingly, consideration has been given to the use of passive damping to remove nutational motion. However, prior approaches have required impractically large mass and size in the damper apparatus to produce useful torques.

In general damper torques require a damping fluid, a damper mass element, and spring connection between the damper mass element and the vehicle. Passive operation involves applying torques to the damper mass element through the damper fluid and spring. The damping constant of the particular mechanism determines the torque and the rate at which the vehicle kinetic energy is converted to heat in the damping fluid. In general, for a given rate of rotation the choice of fluid and damper construction only determines the time required for the same damping effect. Given a long time interval, the amount of kinetic energy converted to heat is substantially the same, if the damper mass is the same. For any given set of circumstances, the damping action is proportional to the damping mass rotational inertia, which makes a large damping mass highly desirable.

From the conventional point of view, a nutation damper mechanism is considered by the analysis of classical mechanics as an oscillating system. It is generally reasoned that the more kinetic energy coupled into the damper device (i.e., the damper mass), the more conversion to heat energy will occur. Accordingly, it is standard practice to tune the damped natural frequency of oscillation to near the nutation frequency of the vehicle, which gives maximum coupling.

Accordingly, it is an object of the invention to provide practical apparatus for passively removing kinetic energy associated with nutational motion.

It is a further object of the invention to provide an efficient nutation damper in which the mass required for sufficient damping is a very small fraction of the vehicle mass.

Briefly stated, in accordance with certain aspects of the invention, a damper is provided which uses vehicle spin and special tuning to produce effective stabilizng torques. By aligning the damper along the spin axis and the proper selection of the mechanical constants, the vehicle spin is exploited to enhance the damping action. It has been found that excellent damping is obtainable with a damper mass substantially under one percent of the vehicle mass.

The invention, together with further objects and advantages thereof, may best be understood by referring to the following description taken in conjunction with the appended drawings in which like numerals indicate like parts and in which:

FIGURE 1 is a diagram illustrating an application of the damper invention to a space vehicle.

FIGURE 2 is a section of the damper application taken on the line 2—2 of FIGURE 1.

FIGURE 3 is a diagram illustrating the mechanics of the FIGURE 1 damper.

FIGURE 4 is a graph illustrating relative effectiveness of damper mechanisms, with and without the invention, for a representative case.

In the illustrated embodiment, a toroidal space vehicle 11 spins about its central axis 9 so as to provide an artificial gravitational field effect, where the apparent gravitational force is directed radially away from the central spin axis 9. Under normal conditions, true gravitational forces are negligible and the torques tending to rotate the spin axes are, primarily, due to the impingement of matter and the shifting of mass within the vehicle. An optical sun sensor 17 is illustrated as the attitude sensor, and attitude control elements in the form of reaction jets 12 and 13. Electrical power for the control system, etc., is available from solar cell arrays as illustrated at 14 and 15. However, in order to minimize the demands on fuel and power, the nutation damper 30 is provided which converts much of the kinetic energy from spin axis oscillation (nutation) into heat in the damping fluid 21. The natural heat radiation and conduction to the vehicle produces ample damper cooling.

The damping mass element 20, in the absence of gravity, is suspended without sagging in the damping fluid 21 by pairs of coil springs 22 and 23, and 24 and 25 which are attached to respective protuberances 26–29 on mass element 20. When the vehicle is undergoing significant acceleration, the mass element 20 is latched to the damper casing 30 by latching means 31 which consists of mating truncated conical surfaces that fit together under g forces. Preferably, the damper components perform dual functions. For example, the mass element is conveniently a reserve storage battery and damping fluid 21 is water or some other liquid such as oil for which an emergency supply is necessary. Where higher damping is desired, the casing 30 can be provided with pocket forming surfaces within which vanes fixed to mass element 20 forces fluid through constricted damping passages. Also, while the illustrated damper has two degrees-of-freedom, a single degree-of-freedom is generally satisfactory because the damper still responds to all nutation.

The generalized equation of motion for a rigid body is:

$$\bar{T} = \dot{\bar{H}} + \omega \times \bar{H} \qquad (1)$$

where:

$\bar{T}$ = external torque vector = $T_R \bar{i} + T_P \bar{j} + T_Y \bar{k}$
$\bar{i}, \bar{j}, \bar{k}$ = unit vectors along roll, pitch and yaw axes of vehicle
$\bar{H}$ = vehicle momentum vector
 = $(I_R \omega_R)\bar{i} + (I_P \omega_P)\bar{j} + (I_Y \omega_Y)\bar{k}$
$(\cdot)$ = derivatives with respect to time
$\omega$ = vehicle angular velocity vector = $\omega_R \bar{i} + \omega_P \bar{j} + \omega_Y \bar{k}$ Now if it is assumed that any motion of personnel or dampers contributes a negligible momentum compared to the total vehicle momentum, the expansion of Equation 1 becomes:

Roll  $T_R = I_R \dot{\omega}_R + (I_Y - I_P) \omega_P \omega_Y$  (2a)

Pitch $T_P = I_P \dot{\omega}_P + (I_R - I_Y) \omega_Y \omega_R$  (2b)

Yaw   $T_Y = I_Y \dot{\omega}_Y + (I_P - I_R) \omega_R \omega_P$  (2c)

where:

$I_R, I_P, I_Y$ = vehicle moments of inertia about roll, pitch and yaw axis, respectively
$\dot{\omega}_R, \dot{\omega}_P, \dot{\omega}_Y$ = angular acceleration of vehicle about roll, pitch and yaw axes, respectively Equation 2 describes the motion of the vehicle under the external torques $T_R$, $T_P$ and $T_Y$. The equation can be linearized if it is assumed that $\omega_Y$, the spin rate, is a constant. $\omega_Y$ can be considered constant if $T_Y = 0$ and the nutation of the spin vector $I_Y \omega_Y$ is below 20 degrees. With these assumptions, Equations 2a and 2b show that the vehicle exhibits sinusoidal oscillations about the two axes perpendicular to the spin vector. This means that $\omega_R$ and $\omega_P$ are sinusoidal. The frequency of these sinusoids, the nutation frequency ($\omega_N$) of the vehicle, is:

$$\omega_N = \sqrt{\left(\frac{I_Y - I_P}{I_R}\right)\left(\frac{I_Y - I_R}{I_P}\right)} \omega_Y \qquad (3)$$

Equation 3 shows that $I_Y$, the inertia of the spin axis, must be larger than $I_P$ and $I_R$ in order for the nutation frequency to be defined. Furthermore, from a more general derivation, it can be shown that the vehicle will tend to rotate about the largest inertia axis. Therefore, $I_Y$ must be the major principal axis of the vehicle. If $I_P$ were larger than $I_Y$, the stable equilibrium condition would be rotation about the pitch axis instead of the yaw axis. Also, if $I_P$ equals $I_Y$, the motion of the vehicle is very difficult to describe and extremely difficult to control.

The diagram of FIGURE 3 includes two balanced mass elements $m/2$, while the actual damper disclosed is simplified to a single mass element, so that either of the $m/2$ mass elements can be considered as corresponding to element 20. As long as the vehicle is not nutating, there are no forces on the $m/2$ mass elements. However, when the spin axis nutates, the damper becomes displaced from its neutral position ($\alpha = 0$), resulting in forces on the mass elements. The torques on the damper ($m/2$ mass elements) about the roll axis of the vehicle are:

$$\Sigma T_{RD} = mr^2 (\ddot{\alpha} + \dot{\omega}_R) = -D\dot{\alpha} - k\alpha + 2F_c r \cos \alpha \qquad (4)$$

where $r$ = distance to the vehicle center from the mass element, $\alpha$ = relative angular displacement between the spin axis Y and the radial line $r$, $\dot{\omega}_R$ = angular acceleration of vehicle about its roll axis, D = damping constant, $k$ = spring constant, and $F_c$ = centrifugal force on each $m/2$ mass element = $(m/2) \omega_Y^2 r \sin \alpha$. Substituting, assuming $\alpha$ is small, such that $\cos \alpha \simeq 1$ and $\sin \alpha \simeq \alpha$:

$$\Sigma T_{RD} = mr^2 (\ddot{\alpha} + \dot{\omega}_R) = -D\dot{\alpha} - (k - m\omega_Y^2 r^2)\alpha \qquad (5)$$

Therefore, $$\ddot{\alpha} + \dot{\omega}_R + \frac{D\dot{\alpha}}{mr^2} + \left(\frac{k}{mr^2} - \omega_Y^2\right)\alpha = 0 \qquad (6)$$

The motion of the double tuned damper is that of a spring mass system with damping, and has a natural oscillation frequency of:

$$\omega_n = \left(\frac{k}{mr^2} - \omega_Y^2\right)^{1/2} \qquad (7)$$

The natural oscillation frequency of the single tuned damper, that frequency which results when $\omega_Y = 0$, is:

$$\omega_{no} = \left(\frac{k}{mr^2}\right)^{1/2} \qquad (8)$$

As previously stated, standard practice provides for tuning the conventional single tuned damper to the nutation frequency of the vehicle, which may be stated as (see Equation 3):

$$\omega_{no} = \left(\frac{k_c}{mr^2}\right)^{1/2} = \omega_N \qquad (9)$$

A similar statement for the novel double tuned damper is:

$$\omega_n = \left(\frac{k_c}{mr^2} - \omega_Y^2\right)^{1/2} \simeq \omega_N \qquad (10)$$

The spring constant $k$ of the double tuned damper is larger than that ($k_c$) of the single tuned damper. The additional torque on the double tuned damper, which is due to centrifugal acceleration and results in the term $\omega_Y^2$ in Equation 10, enables $k$ to be larger than $k_c$. Therefore, a larger spring is used in the double tuned damper than in the single tuned damper.

It has been found that the resulting force on damper mass element 20 is increased greatly. This causes much more of the energy in the nutational mode oscillation to be coupled to the damper. The result is faster nutation damping. FIGURE 3 shows the improved performance graphically.

What is claimed is:

1. A nutation damper mechanism for a spin stabilized body comprising:
 (a) a mass element;
 (b) spring suspension means for suspending said mass element from the body;
 (c) said spring suspension means having a neutral position for said mass element displaced from the center of gravity of said body along its spin axis;
 (d) a damper between the body and the mass for resisting relative motion between the body and said mass element by a force proportional to the relative velocity between the body and said mass element.

2. The nutation damper of claim 1 further comprising:
 (e) said spring suspension means having a spring constant $k$ selected so that, $$\left[\omega_s \simeq \omega_n = \left(\left(\frac{k}{mr^2}\right) - \omega_s^2\right)^{1/2}\right]$$

$$\omega_n = \left(\left(\frac{k}{mr^2}\right) - \omega_Y^2\right)^{1/2} \simeq \omega_N$$

where $\omega_n$ is the natural frequency of said damper, $\omega_N$ is the nutation frequency of the vehicle, $r$ is the distance between the centers of gravity of the mass element ($m$) and the body, and $\omega_Y$ is the spin rate of the vehicle.

3. The nutation damper of claim 1 wherein:
 (e) said spring suspension means interconnects said mass element and said body with a plurality of connections;
 (f) said connections lying substantially in one plane perpendicular to said spin axis.

4. Mechanism for damping of nutation of a spin stabilized space vehicle comprising:
 (a) a mass element;
 (b) suspension and damping means interconnecting said mass element and said space vehicle and suspending said mass element in a normal position with its center of gravity along the axis about which said vehicle spins for stabilization at a known distance from the center of gravity of said vehicle;
(c) said means
  (i) being deformable, permitting movement of said mass element in a plane perpendicular to said spin axis,
  (ii) being resilient, resisting relative motion between the vehicle and the mass element by a force proportional to the relative velocity between said vehicle and said mass element and
  (iii) being elastic, exerting a restoring force on said mass element proportional to its deviation in said plane from said normal position
(d) said mass, the elasticity and resilience of the damping and suspension elements of said means and the spin rate of said vehicle being related according to:

$$\omega_n = \left( \frac{k}{mr^2} - \omega_Y^2 \right)^{1/2}$$

where $\omega_n$ is the natural frequency of and $k$ the spring constant of said means, $r$ the distance between centers of gravity of mass element ($m$) and said vehicle and $\omega_Y$ the spin rate of said vehicle and wherein the natural frequency ($\omega_n$) of said means is made approximately equal to the nutation frequency $\omega_N$ of said vehicle.

References Cited

UNITED STATES PATENTS 3,145,948  8/1964  Kershner _____ 244—1
3,270,984  9/1966  Rice _____ 244—1

FERGUS S. MIDDLETON, *Primary Examiner.*

U.S. Cl. X.R.

74—5.5; 188—1